United States Patent
Eide et al.

(10) Patent No.: US 11,008,236 B2
(45) Date of Patent: May 18, 2021

(54) PHOTOCATALYTIC OXIDATION LAUNDRY DEVICE

(71) Applicant: DBG Group Investments, LLC, Dallas, TX (US)

(72) Inventors: Andrew Eide, Rockwall, TX (US); Lloyd Neal Morris, Greeneville, TN (US)

(73) Assignee: DBG GROUP INVESTMENTS, LLC, Dallas, TX (US)

(*) Notice: Subject to any disclaimer, the term of this patent is extended or adjusted under 35 U.S.C. 154(b) by 131 days.

(21) Appl. No.: 16/247,416

(22) Filed: Jan. 14, 2019

(65) Prior Publication Data

US 2019/0315639 A1    Oct. 17, 2019

Related U.S. Application Data

(60) Provisional application No. 62/658,775, filed on Apr. 17, 2018.

(30) Foreign Application Priority Data

Dec. 12, 2018 (EP) .................... 18212008

(51) Int. Cl.
*B01F 5/04* (2006.01)
*B01J 21/06* (2006.01)
(Continued)

(52) U.S. Cl.
CPC ............ *C02F 1/725* (2013.01); *B01F 5/0413* (2013.01); *B01J 21/063* (2013.01); *B01J 35/004* (2013.01);
(Continued)

(58) Field of Classification Search
CPC ............ B01F 5/0413; B01F 2215/0077; B01J 21/063; B01J 35/004; C01B 13/10;
(Continued)

(56) References Cited

U.S. PATENT DOCUMENTS 5,765,403 A    6/1998  Lincoln et al.
7,871,518 B2   1/2011  Ellis et al.
(Continued)

FOREIGN PATENT DOCUMENTS

CN    107119417 A    9/2017
JP    2003-320196    11/2003
(Continued)

OTHER PUBLICATIONS

"New, NASA-Developed, Cold Water" Scott Albrecht, Jul. 4, 2008, downloaded from https://www.hbmag.com/new-nasa-developed-cold-water/.
(Continued)

*Primary Examiner* — Levon J Shahinian
(74) *Attorney, Agent, or Firm* — Workman Nydegger (57) ABSTRACT

This disclosure relates to water treatment devices that utilize photocatalytic oxidation to generate oxidizing agents. A water treatment device is configured to be connected in line between a water supply and a washing machine. Wash water from the water supply passes into the device and through a conduit of the device. A reaction chamber includes an ultraviolet lamp and a catalyst cell for generating the oxidizing agents. The generated oxidizing agents are injected into the wash water as it passes through the conduit. The water treatment device also includes a flow sensor placed in line with the conduit to determine when the device should be activated to generate the oxidizing agents.

20 Claims, 6 Drawing Sheets

(51) Int. Cl.
  B01J 35/00 (2006.01)
  C01B 13/10 (2006.01)
  C02F 1/32 (2006.01)
  C02F 1/72 (2006.01)
  C02F 1/78 (2006.01)
  C11D 7/04 (2006.01)
  C11D 11/00 (2006.01)
  D06F 39/02 (2006.01)
  D06F 39/08 (2006.01)
  C02F 103/02 (2006.01)

(52) U.S. Cl.
  CPC .............. *C01B 13/10* (2013.01); *C02F 1/32* (2013.01); *C02F 1/325* (2013.01); *C02F 1/78* (2013.01); *C11D 7/04* (2013.01); *C11D 11/0017* (2013.01); *D06F 39/02* (2013.01); *D06F 39/088* (2013.01); *B01F 2215/0077* (2013.01); *C02F 2103/02* (2013.01); *C02F 2201/326* (2013.01); *C02F 2201/3223* (2013.01); *C02F 2209/40* (2013.01); *C02F 2305/023* (2013.01); *C02F 2305/10* (2013.01); *C02F 2307/12* (2013.01)

(58) Field of Classification Search
  CPC .. C02F 1/32; C02F 1/325; C02F 1/725; C02F 1/78; C02F 2103/02; C02F 2201/3223; C02F 2201/326; C02F 2209/40; C02F 2305/023; C02F 2305/10; C02F 2307/12; C11D 7/04; C11D 11/0017; D06F 39/02; D06F 39/088
  USPC ............................. 8/158, 159; 68/13 R, 207
  See application file for complete search history.

(56) References Cited

U.S. PATENT DOCUMENTS

| 8,557,177 | B1 | 10/2013 | Elrod |
| 2006/0163135 | A1 | 7/2006 | Ellis |
| 2013/0306569 | A1 | 11/2013 | Johnston |

FOREIGN PATENT DOCUMENTS

| JP | 2008-272616 A | 11/2008 |
| WO | WO 2006/002406 | 1/2006 |
| WO | WO 2007/143785 | 12/2007 |
| WO | WO2008156813 | 12/2008 |
| WO | WO 2015/037538 | 3/2015 |

OTHER PUBLICATIONS

"Welcome to the NoSuds Revolution" Lester Lin, No Date, downloaded from http://nosuds.com/NSSpec.htm on Jan. 14, 2019.
"EcoWasher: Get the gist" Author Unknown, No Date, downloaded from https://shopedenpure.com/pre-sales-page#_WkbcQ0xFxBz on Jan. 14, 2019.
"Detergentless laundry ozone generator for cleaning and disinfecting for washing" Author Unknown, downloaded from https://www.ebay.com/itm/Detergentless-laundry-ozone-generator-for-cleaning-and-disinfecting-for-washing-/112623873149 on Jan. 19, 2019.
International Search Report issued in PCT/US2019/013663 dated Feb. 28, 2019.

PHOTOCATALYTIC OXIDATION LAUNDRY DEVICE

CROSS-REFERENCE TO RELATED APPLICATIONS

This application claims the benefit of and priority to U.S. Provisional Patent Application Ser. No. 62/658,775, filed on Apr. 17, 2018 and titled "Photocatalytic Oxidation Laundry Device," the entirety of which is incorporated herein by this reference.

BACKGROUND

Washing of laundry typically involves the use of heated water, detergents, bleaches, and special cleaning solutions. These cleaning agents typically include a significant amount of phosphates. Phosphates are a significant water pollutant. Chlorine from bleach compositions also contributes to water pollution. In addition, the use of heated water requires energy expenditure and heated water can exacerbate problems related to fabric shrinking. The use of detergents and heated water can also increase the rate of damage to fabric and decrease the useful lifespan of clothing articles.

Moreover, some people may be allergic to the standard detergent formulations and must use non-allergenic formulas, which are typically more expensive and/or less effective. In addition, although the typical washing machine has a rinse cycle, detergent residues may remain. Residual detergent can cause irritation to those who are allergic or have sensitive skin, can dull fabric colors, and can leave a sticky surface on the clothing.

Accordingly, there is a long felt and ongoing need for systems, devices, and methods for improving laundry washing without the limitations related to conventional hot water and detergent use.

BRIEF SUMMARY

This disclosure relates to water treatment devices and related systems and methods that utilize photocatalytic oxidation to generate laundry wash water enhanced with oxidizing agents. In one embodiment, a water treatment device is configured to be connected in line between a water supply and a washing machine. The device includes an inlet and an outlet. In use, wash water from the water supply passes into the device through the inlet and into a conduit within the device before passing out of the outlet.

The water treatment device also includes a photocatalytic assembly including a reaction chamber, an ultraviolet lamp disposed at least partially within the reaction chamber, and a catalyst cell within the reaction chamber. The catalyst cell generates the oxidizing agents when exposed to ultraviolet light from the lamp. The water treatment device also includes an injector (e.g., a Venturi injector) that is connected to the reaction chamber and to the conduit to enable passage of oxidizing agents generated in the reaction chamber to be passed into the conduit and mixed with wash water passing through the conduit en route to a connected washing machine.

In some embodiments, the water treatment device also includes a flow sensor (e.g., a Hall effect sensor) coupled to the conduit and configured to sense the flow of wash water through the conduit. A controller is communicatively coupled (e.g., electrically wired) to the photocatalytic assembly and the flow sensor. The controller includes memory, one or more processors, and/or other logic components that enable the controller to receive a flow state signal from the flow sensor and to activate or deactivate the ultraviolet lamp of the photocatalytic assembly in accordance with the detected flow. In this manner, the water treatment device is able to operate in conjunction with actual water demand of a connected washing machine.

Additional features and advantages will be set forth in part in the description that follows. It is to be understood that both the foregoing summary and the following detailed description are exemplary and explanatory only and are not to be read as limiting the disclosure to any particular set of embodiments.

BRIEF DESCRIPTION OF THE DRAWINGS

A more particular description will be rendered by the embodiments illustrated in the appended drawings. It is appreciated that these drawings depict only exemplary embodiments of the disclosure and are therefore not to be considered limiting of its scope. In the accompanying drawings.

DETAILED DESCRIPTION

Figures 1A, 1B, 1C:
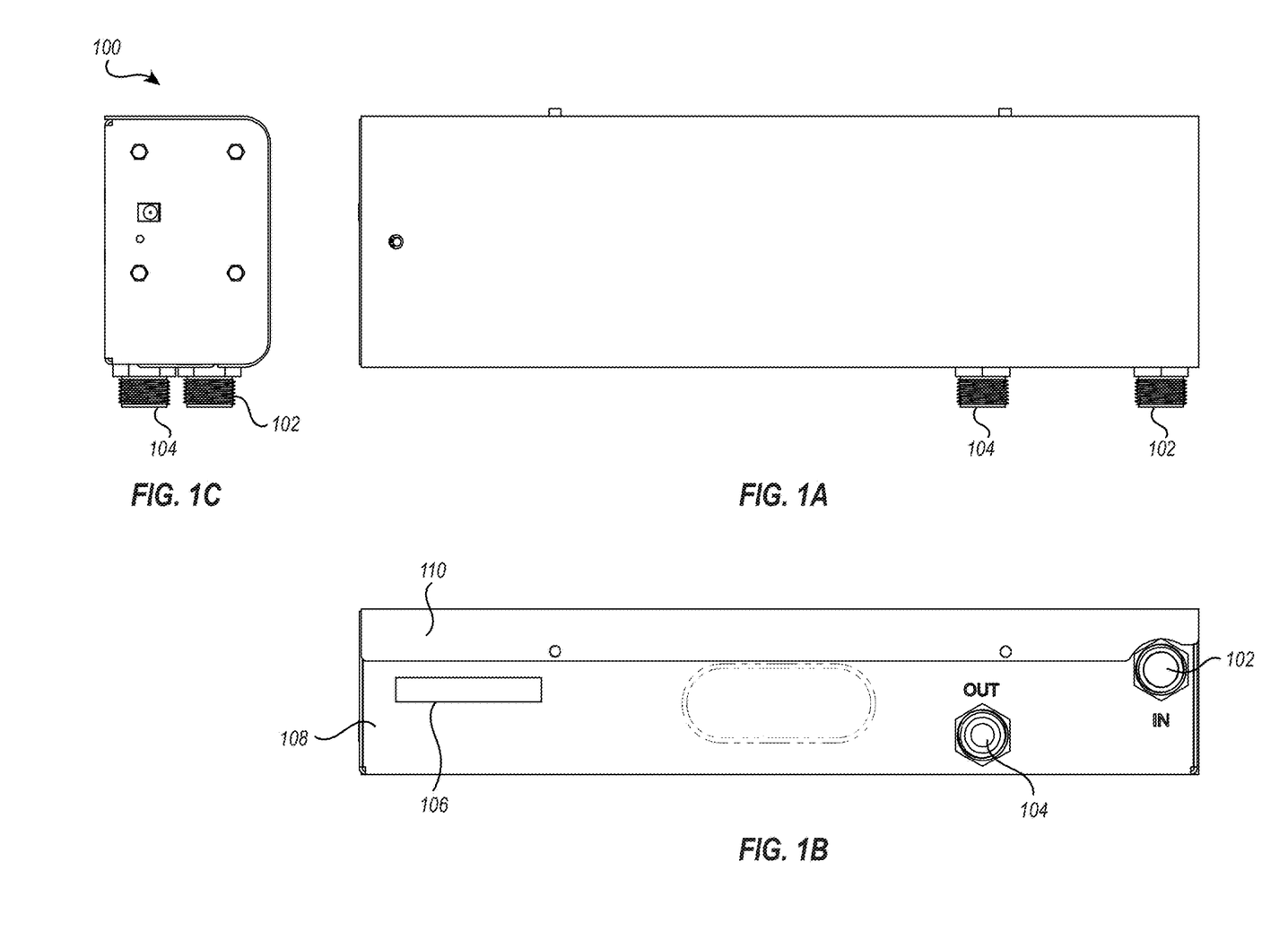
FIGS. 1A through 1C illustrate top, front, and side views, respectively, of an exemplary water treatment device.

FIGS. 1A through 1C illustrate top, front, and side views, respectively, of an exemplary water treatment device 100. The illustrated water treatment device 100 includes an inlet 102 and an outlet 104 each with a connector for coupling to a hose, pipe, or other fluid transfer means. As explained in further detail below, the water treatment device 100 is configured to be connected in line between a water supply and a washing machine. Wash water from the water supply passes into the inlet 102, through the water treatment device 100, and then out through the outlet 104 toward the washing machine.

As shown, the water treatment device 100 may include a frame 108 and a cover 110 for shielding the internal components of the device. the cover 110 may be removable to allow for access to the internal components. The water treatment device 100 may also include a display 106 for displaying one or more of a device or lamp operational status, error indicator, water usage metrics, device settings, and the like.

As explained in more detail below, the water treatment device 100 is formed to beneficially balance the competing design considerations of (1) having a device with a readily installable, compact size with (2) having sufficient photocatalytic activity for effectively activating wash water. In other words, the desire to provide sufficient generation of oxidizing agents tends to drive the size of the device upwards; however, if the device is sized to be too large it likely becomes cumbersome and/or impossible to install in the limited space of a typical laundry room.

Certain embodiments described herein are able to generate oxidizing agents in amounts sufficient for effective cleaning while maintaining a compact overall size that allows for easy installation even in circumstances where space is limited. In some embodiments, for example, the water treatment device 100 may have a length of about 17 inches (e.g., about 12 to 24 inches), a width of about 4 inches (e.g., about 2 to 8 inches), and a height of about 5 inches (e.g., about 3 to 10 inches). Devices having dimensions within these ranges beneficially provide for effective operation while also being readily installable.

Figure 2:
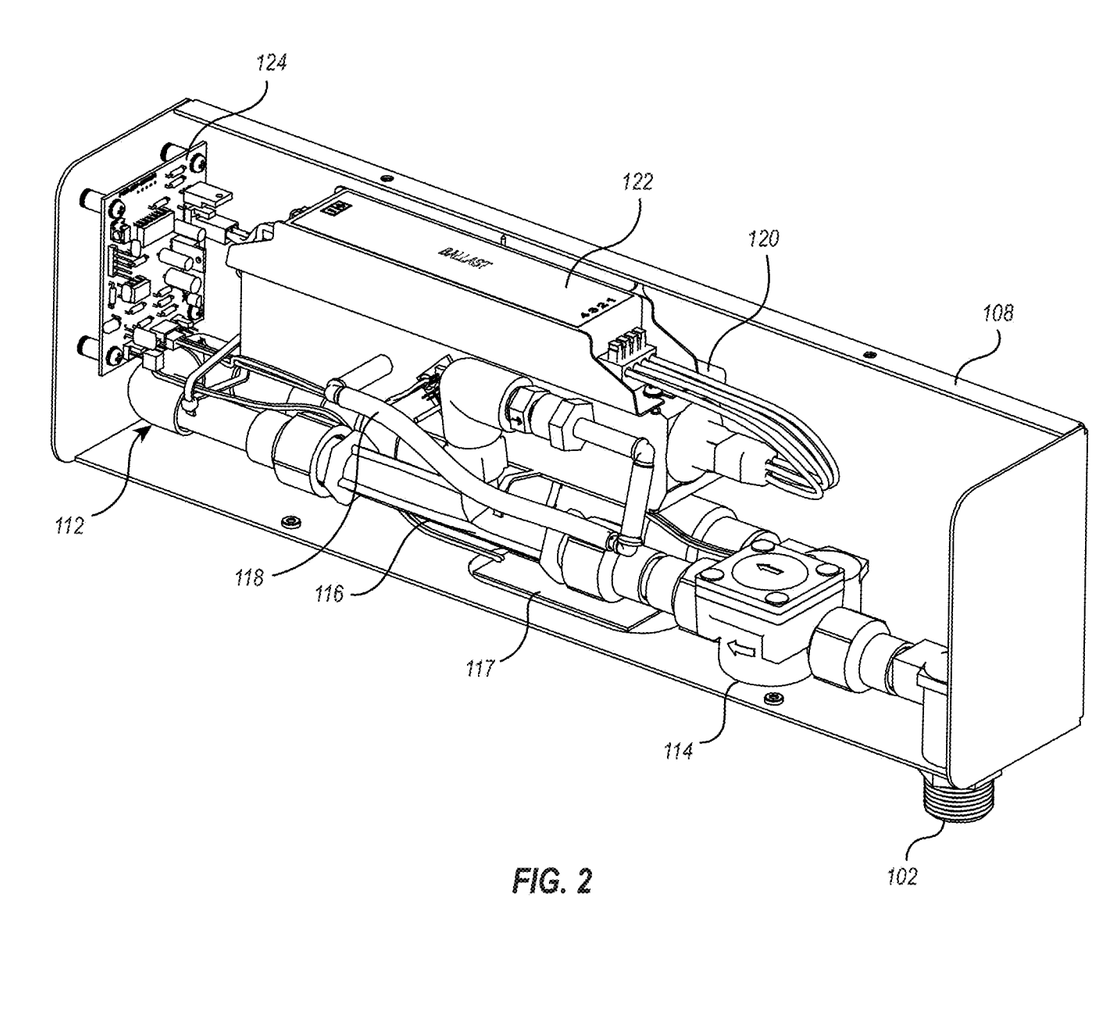
FIG. 2 illustrates a view of the water treatment device of FIG. 1 with cover removed to better show internal componentry of the device.

FIG. 2 illustrates the water treatment device 100 with cover removed to better show the internal components of the device. The inlet 102 connects to a conduit 112 which extends through the device and connects to the outlet (not fully visible in this view). The device 100 also includes a photocatalytic assembly including a reaction chamber 120 and a ballast 122. As explained in more detail below, the ballast 122 powers a lamp housed within the reaction chamber 120. The lamp is configured to emit ultraviolet light when activated. A catalyst cell is also included within the reaction chamber 120. The catalyst cell is capable of generating one or more oxidizing agents in ambient atmosphere within the reaction chamber 120 when exposed to ultraviolet light from the lamp.

In the illustrated embodiment, an injector 116 is positioned in line as part of the conduit 112. A connecting duct 118 couples the reaction chamber 120 to the injector 116 and allows passage of the oxidizing agents generated in the reaction chamber 120 into the conduit 112. For example, the injector 116 may be configured as a differential pressure Venturi injector, such as one of those sold under the trade name MAZZEI. The injector may operate by using differential pressure resulting from the fluid flow through the conduit 112 to introduce air from the reaction chamber 120 into the conduit 112. In operation, the injected air includes the oxidizing agents generated within the reaction chamber 120.

The illustrated water treatment device 100 also includes a controller 124 that is communicatively coupled to the ballast 122 to control powering and depowering of the ultraviolet lamp. The controller 124 is also coupled to a leak detector 117. Upon detection of excessive moisture by the leak detector 117, the controller 124 can operate to set off an audio or visual alarm, error display, or the like. The controller 124 may additionally or alternatively prevent activation of the photocatalytic assembly when a leak has been detected. The controller 124 is also communicatively coupled to a flow sensor 114 coupled to the conduit 112. The flow sensor 114 is configured to sense the flow of wash water through the conduit 112. The flow sensor 114 may be configured, for example, as a Hall effect flow sensor. In other embodiments, additional or alternative flow sensors as known in the art may be included, such as an orifice plate, Venturi tube, rotameter, pitot tube assembly, calorimetric flowmeter, turbine flowmeter, vortex flow meter, electromagnetic flowmeter, ultrasonic doppler flowmeter, positive displacement flowmeter, thermal flowmeter, or Coriolis flowmeter.

In operation, when the flow sensor 114 determines that wash water is flowing through the conduit 112, the controller 124 receives a corresponding flow state signal and operates to power the lamp within the reaction chamber 120. This ensures that when water is flowing through the conduit 112, the photocatalytic assembly is operating to generate oxidizing agents for injection into the passing water. When the flow sensor 114 senses that that water flow has stopped, the flow state signal sent to the controller 124 causes the controller 124 to shut down the ultraviolet lamp. This ensures that when water is not flowing through the device, the photocatalytic assembly is not wasting power or needlessly generating oxidizing agents.

Figure 3:
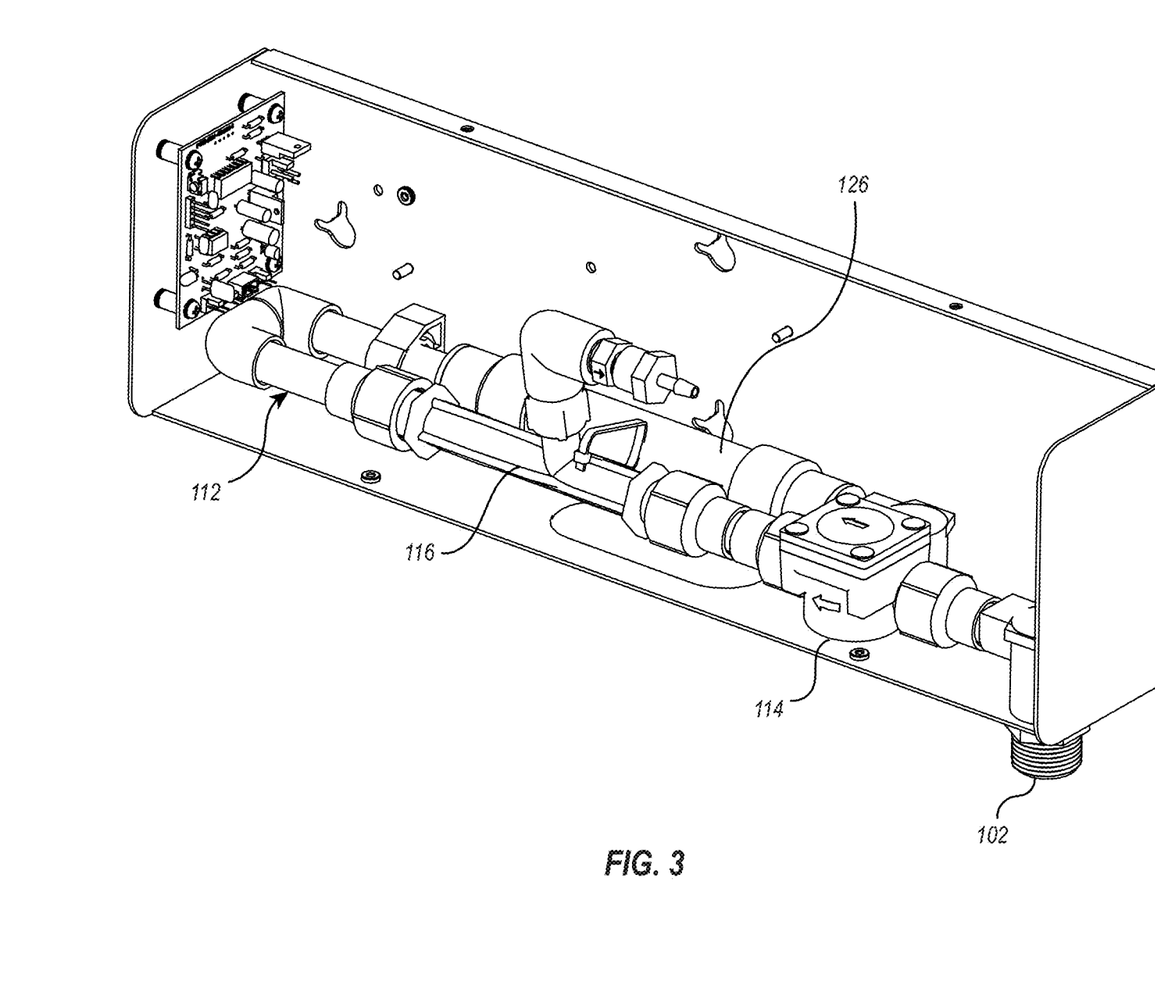
FIG. 3 illustrates an additional view of the water treatment device with the photocatalytic assembly removed.

FIG. 3 is another view of the water treatment device 100 with portions of the photocatalytic assembly removed to better illustrate other portions of the conduit 112. As shown, the conduit 112 may include a mixer section 126 located downstream from the injector 116. The mixer section 126 functions to break up gas bubbles introduced by the injector 116, allowing more efficient use of the introduced oxidizing agents and promoting better cleaning. The mixer section 126 may be configured as a static mixer including interior baffles and/or other mixing components for breaking up entrained gas bubbles.

Figure 4:
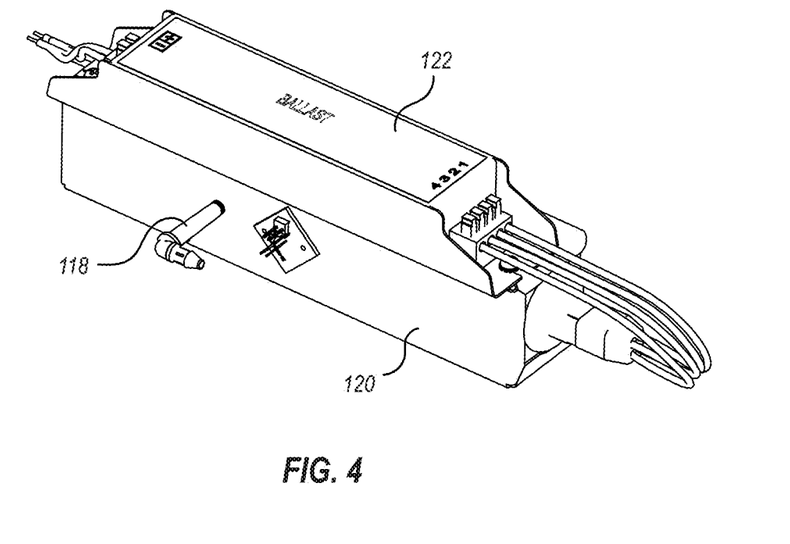
FIG. 4 illustrates the photocatalytic assembly of the water treatment device.
Figure 5:
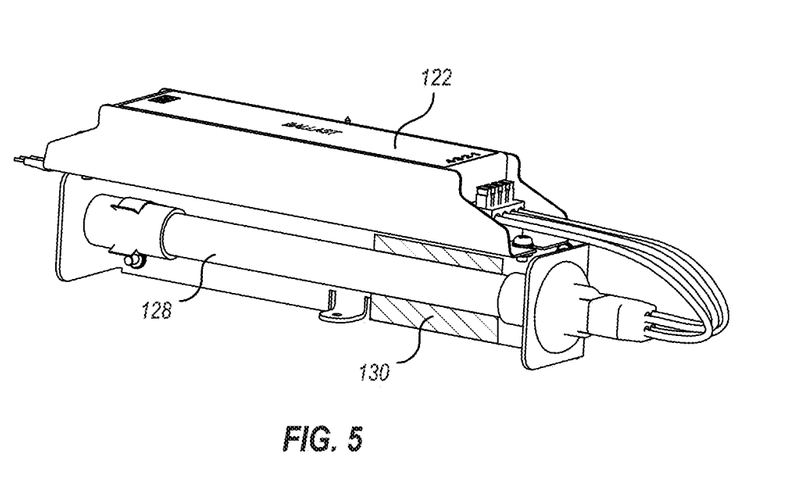
FIG. 5 illustrates the photocatalytic assembly of FIG. 4 with portions of the chamber wall removed to show an internal ultraviolet lamp and catalyst cell.

FIG. 4 shows the photocatalytic assembly detached from the remainder of the device, and FIG. 5 shows a portion of the wall of the reaction chamber 120 removed to show the ultraviolet lamp 128. As indicated by reference number 130, at least a portion of the wall of the reaction chamber 120 is coated with or otherwise includes a catalyst cell configured to generate one or more oxidizing agents upon exposure to ultraviolet light from the lamp. The oxidizing agents may include, for example, hydrogen peroxides, hydroxides, free oxygen molecules, and super oxide ions.

The photocatalytic assembly is preferably configured so that when the ultraviolet lamp is activated, ozone is omitted from the generated oxidizing agents. while ozone is a powerful oxidizing agent, it has been found to be excessively harsh for laundry cleaning applications. For example, ozone can increase the rate of fabric deterioration and can even cause damage to gaskets and other components of the washing machine over time. It has been surprisingly found that by tailoring the photocatalytic assembly to generate the foregoing listed oxidizing agents, but not ozone, effective cleaning power is maintained without introducing the detrimental effects related to ozone.

While the illustrated catalyst cell 130 is shown in a particular location, it will be understood that multiple catalytic cells and/or cells in other locations may be utilized, so long as they are positioned to receive ultraviolet light emitted by the lamp 128.

The catalyst cell 130 may comprise a metal oxide such as titanium oxide and may optionally include one or more transition metals and/or alloys of transition metals. Examples of additional or alternative photocatalytic materials that may be utilized include graphene oxide, metal-organic frameworks (MOFs), other semiconductor materials, quantum dots, tantalite, other oxides (e.g., zinc, copper, iron, cadmium, tin, zirconium, or gallium oxide), sulfides (e.g., zinc sulfide), silica, and combinations thereof.

The size of the lamp 128 and the surface area of the catalyst cell 130 together determine the level of oxidizing agent generation when the photocatalytic assembly is activated. If, for example, the lamp 128 is sized too small relative to the catalytic cell 130, there may be insufficient ultraviolet light to make full use of the available catalytic capacity. If, on the other hand, the lamp 128 is too large relative to the catalyst cell 130, power will be unnecessarily wasted in generating excess ultraviolet light.

For a typical ultraviolet lamp of about 5 to 30 watts and a ½ inch diameter, the length is preferably about 4 inches to about 12 inches, or more preferably about 6 inches to about 9 inches. The corresponding catalyst cell 130 preferably has a surface area of at least about 8 in$^2$ (50 cm$^2$), or at least about 12 in$^2$ (75 cm$^2$), or more preferably at least about 16 in$^2$ (100 cm$^2$). The catalyst cell 130 preferably has a surface area of no more than about 24 in$^2$ (150 cm$^2$) or alternatively no more than about 31 in$^2$ (200 cm$^2$). Lamp sizes and catalyst cell dimensions within the foregoing ranges have beneficially shown efficient generation of oxidizing agents at levels sufficient for effective cleaning of laundry using the device.

Figure 6:
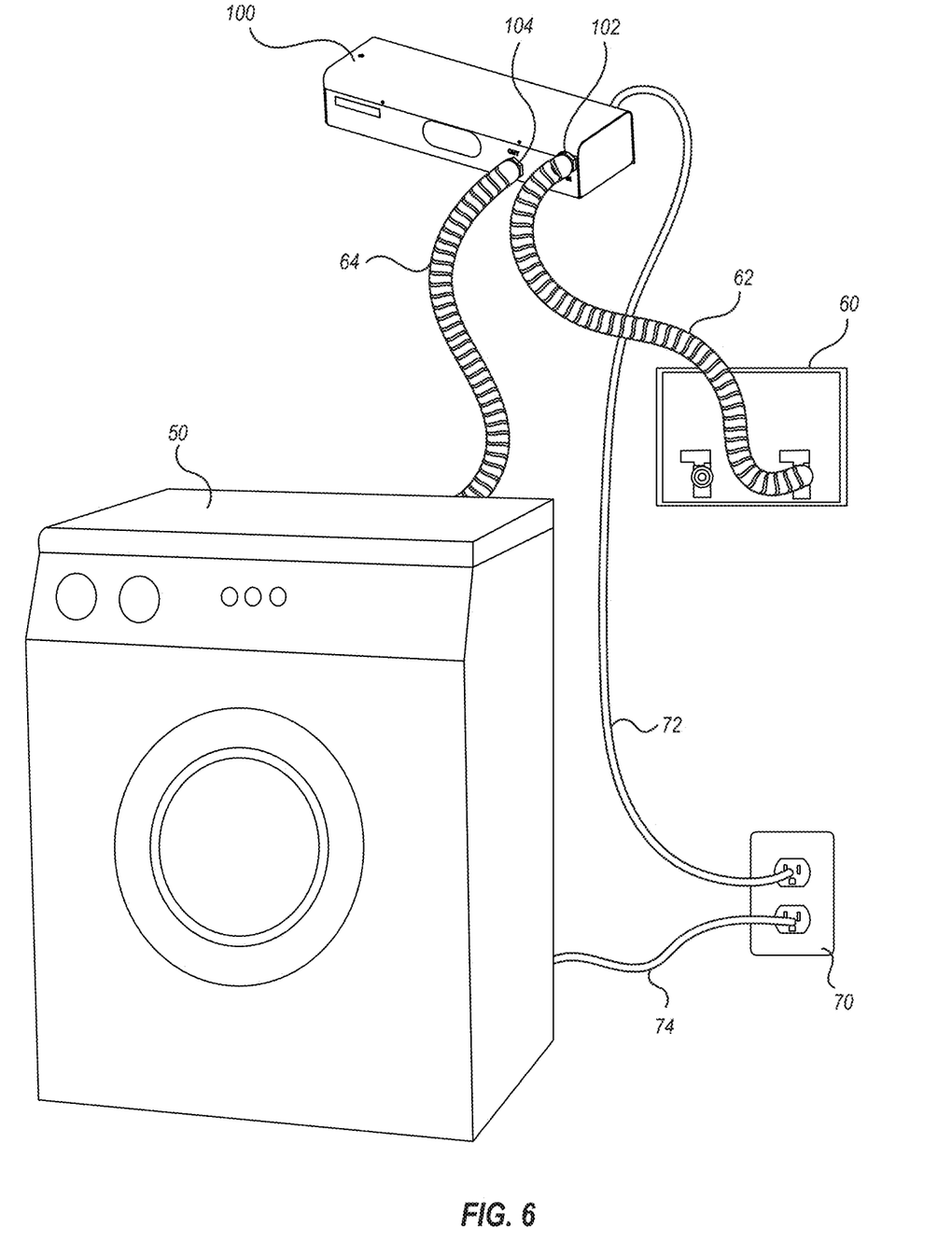
FIG. 6 illustrates the water treatment device connected in line between a water supply and a washing machine.

FIG. 6 illustrates a water treatment system where the water treatment device 100 is connected in line between a water supply 60 and a washing machine 50. As shown, a first hose 62 may be connected to the water supply 60 (typically to the cold water supply), at one end and to the inlet 102 at the other end. The hot water supply may be shut off or optionally connected directly to the washing machine 50. A second hose 64 extends from the outlet 104 of the water treatment device 100 to an inlet of the washing machine 50. The water treatment device 100 and the washing machine 50 are connected to an electrical outlet 70 via electrical lines 72 and 74.

Beneficially, the washing machine 50 does not need to be electrically connected to the water treatment device 100 in any way. Other laundry water treatment devices typically require the washing machine to be electrically connected to the treatment device. The conventional treatment device then operates based on measured electrical loads which suggest different wash cycles of the washing machine. To ensure the device is active during a fill cycle, such devices must be customized and/or calibrated to specific washing machine models, since washing machine models often differ in the way electrical loads relate to different wash cycles. This lack of versatility can make the setup and use of such devices cumbersome.

In contrast, the water treatment device embodiments described herein do not depend on an electrical connection to the washing machine 50, and are able to provide effective operation with a wide variety of connected washing machines. Because operation of the device 100 is determined by the flow of water through the device, and because the device is connected in line between the water supply 60 and the washing machine 50, the device is configured to operate and inject oxidizing agents into the wash water when the washing machine 50 is actually filling with wash water.

Further, the preferred injector within the device 100 operates based on pressure differential, meaning higher flowrates passing through the device 100 will receive a greater supply of the activated air from the reaction chamber based on the gas/liquid ratio of the Venturi injector. This aids in maintaining consistency in the levels of oxidizing agents injected into the wash water across different operational circumstances, such as with different washing machine models and/or different water pressure setups.

In some embodiments, the water treatment device is configured to provide the wash water with an oxidizing agent concentration of about 1 ppm (e.g., about 0.5 ppm to about 2 ppm, or about 0.75 ppm to about 1.5 ppm). As used herein, these values are a measure of oxidizing agent concentrations measured as hydrogen peroxide using standard water quality testing methods known in the art.

In preferred embodiments, the water treatment device does not add any disinfectants (such as silver ions, detergents, and the like) to the passing wash water other than the oxidizing agents generated in the reaction chamber and injected via the injector. Water treatment device embodiments as described herein are beneficially able to provide effective cleaning and/or disinfecting power without the need to use these additional agents. This allows users to save on the cost of these agents and reduces the introduction of these agents into the environment.

Terms such as "approximately," "about," and "substantially," as used herein represent an amount or condition close to the stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a stated amount or condition.

Specific elements or components described in relation to any particular embodiment described herein may be substituted for or combined with elements described in relation to any other embodiment described herein.

Example

Figure 7A:
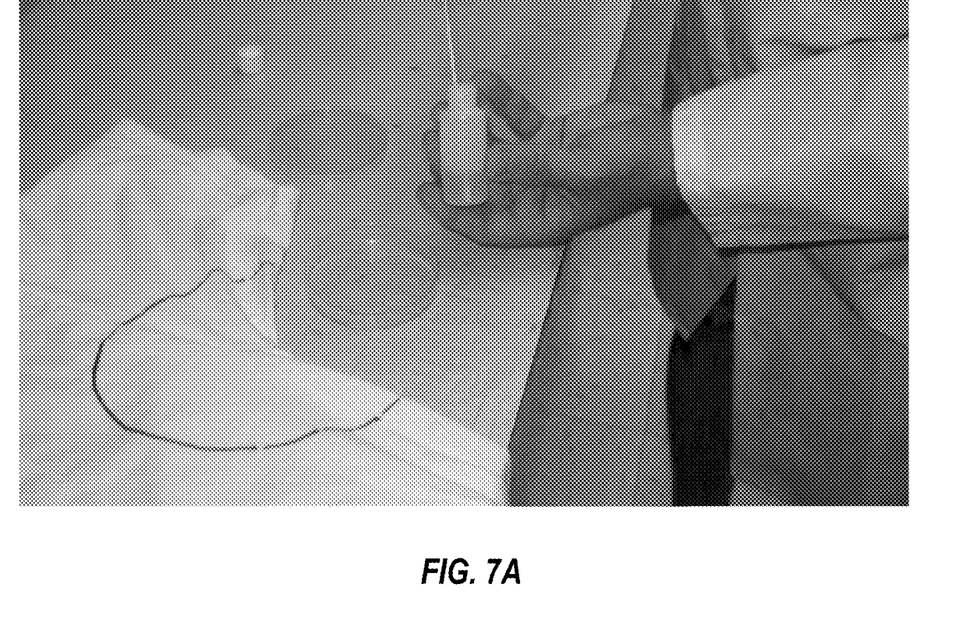
FIGS. 7A through 7C are photographs of an efficacy test showing the effectiveness in washing laundry with activated water from a water treatment device as described herein.
Figure 7B:
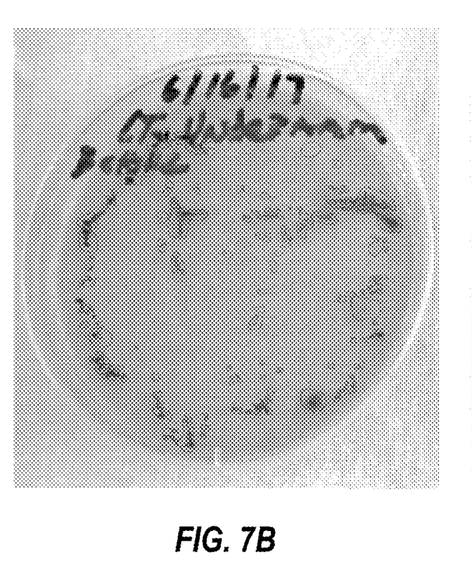
Figure 7C:
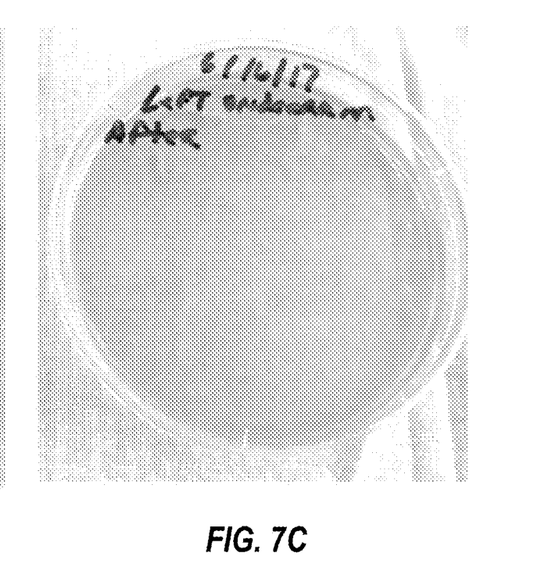

A lab technician wore a new T-shirt for 2 days. Following 2 days of wear, the T-shirt was removed and a sterile swab was used to collect a sample by rubbing the tip back and forth under the left arm as shown in FIG. 7A. The swab was then placed in a nutrient broth to promote the growth of any collected bacteria. The solution was then poured into a Petri dish following standard microbiological protocols, and the Petri dish was incubated for 36 hours. The T-shirt was then washed in a washing machine using cold water activated by a water treatment device as described herein. After washing, the same sampling protocol was used and another Petri dish was filled and incubated for 36 hours. The results following the incubation period are shown in FIGS. 7B and 7C. Although bacteria were present on the T-shirt prior to washing, no bacteria growth was observed in the sample taken following washing.

The invention claimed is:

1. A water treatment device for providing activated wash water to a washing machine, the treatment device comprising:
   an inlet for receiving pre-treated wash water from a water supply;
   an outlet for passing activated wash water out of the treatment device and toward a washing machine;
   a conduit extending between the inlet and outlet for passing water from the inlet to the outlet;
   a photocatalytic assembly including
      a reaction chamber,
      a lamp disposed at least partially within the reaction chamber and configured to generate ultraviolet light when activated, and
      a catalyst cell disposed within the reaction chamber, the catalyst cell being configured to generate one or more oxidizing agents upon exposure to ultraviolet light from the lamp;
   an injector coupled to the reaction chamber and the conduit to enable passage of oxidizing agents generated in the reaction chamber to be passed into the conduit and mixed with the wash water;
   a flow sensor coupled to the conduit and configured to sense flow of wash water through the conduit; and
   a controller communicatively coupled to the flow sensor and to the photocatalytic assembly, the controller being configured to
      receive from the flow sensor a flow state signal indicating that measured flow through the conduit is above or below a predetermined threshold, and based on the received flow state signal, activate the lamp of the photocatalytic assembly when flow is determined to be above the threshold and deactivate the lamp of the photocatalytic assembly when flow is determined to be below the threshold.

2. The device of claim 1, wherein the photocatalytic assembly is configured to generate one or more of hydrogen peroxides, hydroxides, free oxygen molecules, and super oxide ions when activated.

3. The device of claim 1, wherein the photocatalytic assembly does not generate ozone when activated.

4. The device of claim 1, wherein the threshold is zero flow such that any measured flow through the conduit results in the controller activating the lamp of the photocatalytic assembly.

5. The device of claim 1, wherein the catalyst cell has a surface area of at least about 50 $cm^2$.

6. The device of claim 1, wherein the catalyst cell comprises titanium oxide and one or more transition metals and/or alloys thereof.

7. The device of claim 1, wherein the lamp has a length that is about 50% to about 150% a length of the catalyst cell.

8. The device of claim 1, wherein the lamp has a length of about 4 inches to about 12 inches.

9. The device of claim 1, wherein the injector is configured as a Venturi injector.

10. The device of claim 9, wherein the Venturi injector is configured to supply about 0.5 ppm to about 2 ppm of oxidizing agent to the wash water, measured as hydrogen peroxide.

11. The device of claim 1, wherein the lamp is fully contained within the chamber.

12. The device of claim 1, wherein the device is operable to provide activated wash water to a washing machine without any electrical connections to the washing machine.

13. The device of claim 1, wherein the flow sensor is a Hall effect flow sensor.

14. The device of claim 1, wherein the flow sensor is disposed upstream of the injector.

15. The device of claim 1, wherein the device does not add any chemical additives or disinfectants other than the one or more oxidizing agents to the wash water.

16. The device of claim 1, wherein the conduit further comprises a mixer section disposed downstream of the injector and configured to break up gas bubbles introduced into the conduit by the injector.

17. A water treatment system for providing activated wash water to a washing machine, the water treatment system comprising:
   a washing machine; and
   a water treatment device as in claim 1, configured to be connected in-line between a water supply and the washing machine.

18. A method of generating activated wash water for use in washing laundry, the method comprising:
   providing a water treatment device as in claim 1;
   connecting the water treatment device in-line between a water supply and a washing machine; and
   operating the washing machine to cause wash water to move through the water treatment device, the water treatment device operating to entrain the passing wash water with one or more oxidizing agents.

19. The method of claim 18, wherein the water treatment device is operated to provide a concentration of oxidizing agents in the wash water of about 0.5 ppm to about 2 ppm, measured as hydrogen peroxide.

20. The method of claim 18, wherein the one or more oxidizing agents omit ozone.

* * * * *